US012591679B2

(12) United States Patent
Simeonov et al.

(10) Patent No.: US 12,591,679 B2
(45) Date of Patent: Mar. 31, 2026

(54) ELECTRONIC DEVICE MANAGEMENT USING A DEVICE MANAGEMENT SYSTEM

(71) Applicant: Omnissa, LLC, Mountain View, CA (US)

(72) Inventors: Ivaylo Kirilov Simeonov, Sofia (BG); Josiah Lee Rogers Whitfield, Marietta, GA (US); Hokie Mulyanto, Johns Creek, GA (US); Nisma Nayeem, Mountain House, CA (US); Daniel L. Sanford, Canton, GA (US)

(73) Assignee: Omnissa, LLC, Mountain View, CA (US)

( * ) Notice: Subject to any disclaimer, the term of this patent is extended or adjusted under 35 U.S.C. 154(b) by 335 days.

(21) Appl. No.: 18/355,695

(22) Filed: Jul. 20, 2023

(65) Prior Publication Data

US 2025/0028833 A1 Jan. 23, 2025

(51) Int. Cl.
| | |
|---|---|
| *H04W 8/24* | (2009.01) |
| *G06F 8/61* | (2018.01) |
| *G06F 21/57* | (2013.01) |
| *H04L 9/40* | (2022.01) |
| *H04M 1/00* | (2006.01) |
| *H04M 3/00* | (2024.01) |
| *H04W 88/02* | (2009.01) |

(52) U.S. Cl.
CPC .............. *G06F 21/572* (2013.01); *G06F 8/61* (2013.01); *H04L 63/083* (2013.01); *G06F 2221/033* (2013.01)

(58) Field of Classification Search
CPC .... G06F 21/572; G06F 8/61; G06F 2221/033; H04L 63/083
USPC .......................................................... 455/419
See application file for complete search history.

(56) References Cited

U.S. PATENT DOCUMENTS

| | | | | |
|---|---|---|---|---|
| 4,951,308 A | * | 8/1990 | Bishop ...................... | G07F 7/06 |
| | | | | 379/91.01 |
| 2010/0228676 A1 | * | 9/2010 | Librizzi .............. | H04M 1/0287 |
| | | | | 705/306 |
| 2017/0235963 A1 | * | 8/2017 | Ahn .......................... | H04L 9/14 |
| | | | | 713/190 |
| 2019/0019147 A1 | * | 1/2019 | Mccarty .............. | G06Q 10/087 |
| 2021/0110440 A1 | * | 4/2021 | Dion ..................... | G06Q 30/018 |
| 2021/0192484 A1 | * | 6/2021 | Forutanpour ........ | G06Q 20/208 |
| 2021/0334380 A1 | * | 10/2021 | Saluja ................... | G06F 21/568 |
| 2022/0167161 A1 | * | 5/2022 | Sheffield ............. | H04W 12/043 |
| 2023/0007937 A1 | * | 1/2023 | Forutanpour ........... | G07F 7/069 |
| 2024/0356908 A1 | * | 10/2024 | Sheffield ............... | H04L 9/3247 |

OTHER PUBLICATIONS

IP.com search history (Year: 2025).*

* cited by examiner

*Primary Examiner* — Moustapha Diaby
(74) *Attorney, Agent, or Firm* — Kim & Stewart LLP

(57) ABSTRACT

Disclosed are various embodiments for loaning an electronic device. In some embodiments, the recipient of the electronic device can check out or check in the electronic device. In other embodiments, the electronic device can be enrolled in a device management system and receive a package file from a directory service. In some other examples, the electronic device can be reimaged using a refresh payload.

20 Claims, 12 Drawing Sheets

300

START

Receive request to return
electronic device(s)

303

Receive indication electronic
device is being transitioned to
checked in state

306

Alert device management
system

309

Capture device-identifier

313

Send device-identifier to cloud-
based directory service

316

B

Electronic Device Checkout Kiosk

Login to Request Electronic Device

USER

ADMIN

PASSWORD

*******************

SUBMIT

OR

SCAN BADGE ON CARD READER

OR

ENTER PICKUP CODE

400

Electronic Device Checkout Kiosk

Please Select Device Type

Available Device(s)

Type A

Type B

Cancel

Next

403

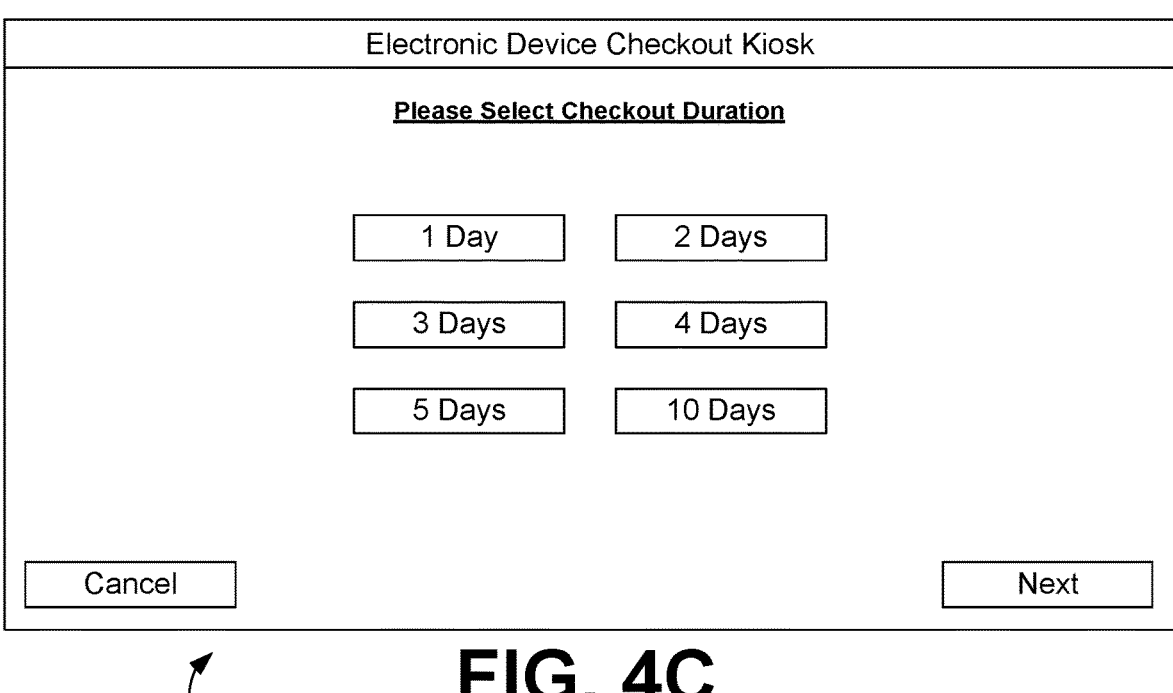

Electronic Device Checkout Kiosk

Please Select Checkout Duration

| 1 Day | 2 Days |

| 3 Days | 4 Days |

| 5 Days | 10 Days |

Cancel                                              Next

Electronic Device Checkout Kiosk

Terms and Conditions

Lorem ipsum dolor sit amet, consectetur adipiscing elit, sed do eiusmod tempor incididunt ut labore et dolore magna aliqua. Ac turpis egestas sed tempus urna et pharetra. Ac turpis egestas sed tempus urna et. Faucibus ornare suspendisse sed nisi. Dui id ornare arcu odio ut sem. Lectus sit amet est placerat in egestas erat imperdiet. Lectus mauris ultrices eros in cursus turpis massa tincidunt dui. Sociis natoque penatibus et magnis dis parturient montes. Arcu odio ut sem nulla pharetra diam sit. Lectus urna duis convallis convallis tellus id interdum velit. Nisi vitae suscipit tellus mauris a diam. Elit ullamcorper dignissim cras tincidunt. Tempor orci dapibus ultrices in iaculis nunc sed augue lacus. Diam phasellus vestibulum lorem sed risus ultricies tristique nulla aliquet. Egestas quis ipsum suspendisse ultrices. Tempus imperdiet nulla malesuada pellentesque. Duis at tellus at urna condimentum. Porttitor leo a diam sollicitudin tempor id. Rhoncus est pellentesque elit ullamcorper dignissim cras. Volutpat blandit aliquam etiam erat. Pellentesque habitant morbi tristique senectus et netus. Tincidunt ornare massa eget egestas purus viverra accumsan in nisl.

Cancel                                              Agree

ELECTRONIC DEVICE MANAGEMENT USING A DEVICE MANAGEMENT SYSTEM

BACKGROUND

Users within an enterprise could need access to a certain type of electronic device or an electronic device running a specific operating system (e.g., Microsoft Windows, Mac OS X, Linux, etc.). Typically, the user has to request the electronic device through the IT team at the organization or enterprise. Additionally, the IT team has to verify the request and information contained in the request before allocating the electronic device. As a result, the manual process can require human input and cause delays.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 4C is a user interface diagram according to various embodiments of the present disclosure.

FIG. 4D is a user interface diagram according to various embodiments of the present disclosure.

DETAILED DESCRIPTION

Figure 1:
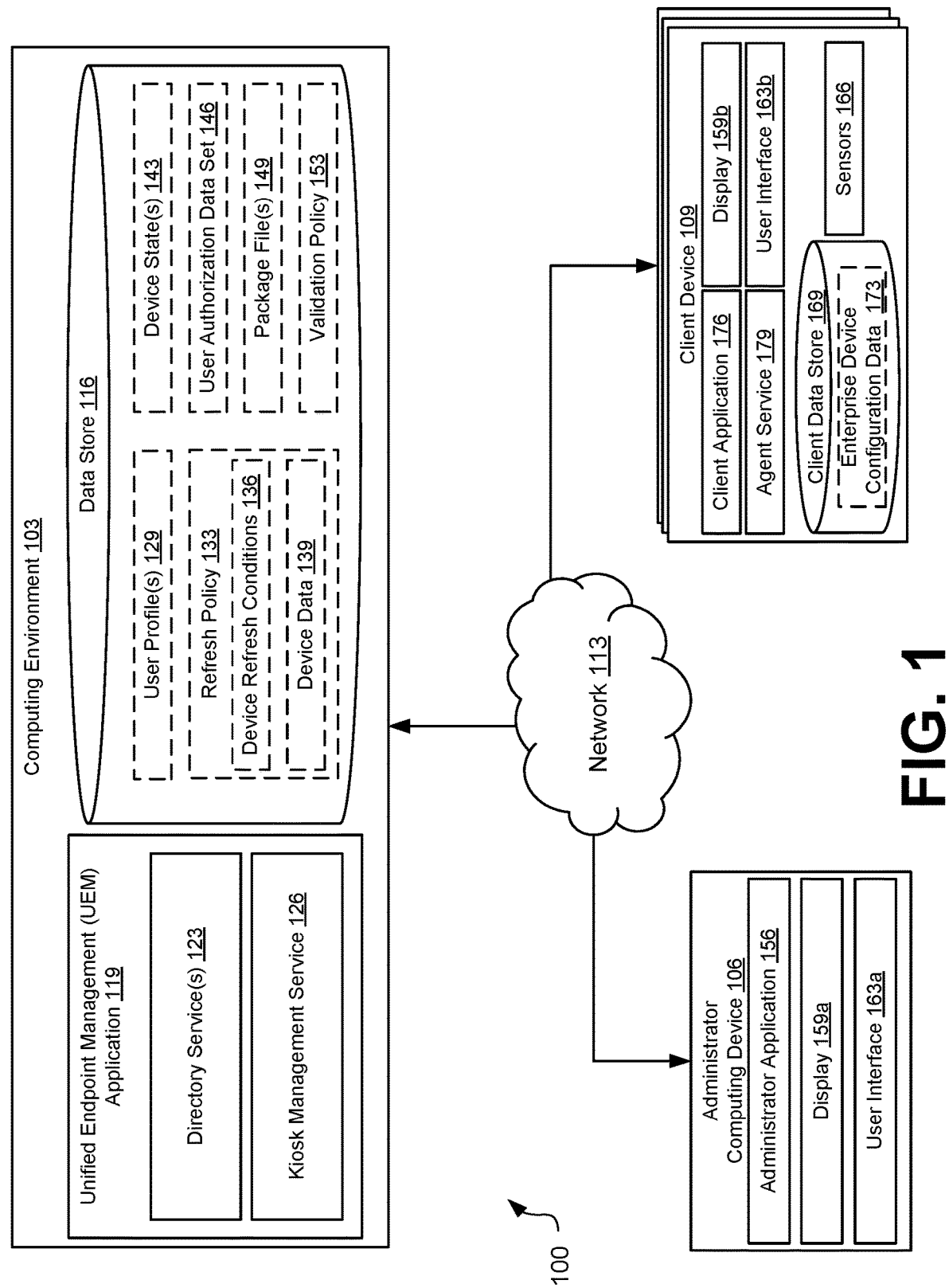
FIG. 1 is a drawing of a networked environment according to various embodiments of the present disclosure.

Disclosed are various approaches for managing electronic devices using a device management system and enabling zero touch refresh for electronic devices using a unified endpoint management application. In some embodiments, the user can request to receive an electronic device. In some other embodiments, the user can request to return the electronic device. In some examples, the kiosk management service can deploy a package file to a requested electronic device. In other examples, the kiosk management service can deploy a refresh payload to a returned electronic device.

Typically, an enterprise or organization works with multiple types of operating systems and/or multiple types of electronic devices. In some instances, the enterprise could only provide users with an electronic device in the office. In some examples, a team within the enterprise or organization may require a mobile device, computer and/or other type of computing device or client device to access an application or for testing purposes. Manually imaging or preparing the electronic device for issue to a user can be a time-consuming process.

Previously, in order to receive an electronic device, a user typically has to request the electronic device and the needs for the electronic device. In some instances, the user could use a kiosk to temporarily receive an electronic device. However, the electronic device received from the kiosk is typically not setup for long-term use, imaged to the needs of the user, or contain applications required and/or requested by the user. In some instances, the user may have to keep the electronic device on or in a stand-by mode as restarting and/or turning it off could factory reset the device and/or restore it to a specified image.

In contrast, the approaches herein introduce electronic device management using a device management system. Accordingly, embodiments of the present disclosure can receive requests for one or more electronic devices, dispense one or more electronic devices, and return one or more electronic devices. In some embodiments, the embodiments of the present disclosure can implement a zero-touch device management approach using a unified endpoint management application.

Upon receiving a request for an electronic device, a sensor can capture the device-identifier associated with the electronic device. The device-identifier is then sent to a directory service, which can enroll the electronic device. In some embodiments, the directory service can manage the device in conjunction with the unified endpoint management application. After enrolling the electronic device, the directory service can send a package file associated with the device-identifier back to the unified endpoint management application and/or the electronic device. The contents of the package file could be preset. In some examples, the contents of the package file can be customized by the user. The package file is deployed to the electronic device. In some instances, an electronic device can receive a plurality of package files. Once the package file is installed, the kiosk management service can dispense the electronic device to be received by the recipient. Additionally, the kiosk management service can update the state of the electronic device in the kiosk and/or the directory service. The state of the device can be used to manage inventory and track the device.

In another embodiment of the present disclosure, the kiosk management service can receive a request to return the checked-out electronic device. Upon receiving the electronic device into the kiosk, the sensor can capture the device-identifier associated with the electronic device. The device-identifier is sent to the directory service. In response to receiving the device-identifier, the directory service can send a refresh payload to the electronic device and/or the unified endpoint management application. In some instances, the refresh payload can erase an existing operating system to install a new and or updated operating system, install drivers and plugins, and validate the operation of the electronic device after installation. The refresh payload is deployed to the electronic device for a zero touch refresh of the electronic device and to prepare it for future use.

The techniques described herein for enhance electronic device management provide a significant technical improvement by reducing database storage (e.g., storing new electronic device requests, storing information in multiple databases regarding the electronic device, etc.) and reducing network bandwidth of computing resources (e.g., related to evaluating and processing requests for one or more electronic devices). These techniques can also provide significant technical benefit such as streamlining device management (e.g., single application, reusing credentials on temporary devices, etc.) and reducing operation costs (e.g., fewer applications/systems for loaning electronic devices, fewer personnel, less equipment, etc.).

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

With reference to FIG. 1, shown is a networked environment 100 according to various embodiments. The networked environment 100 includes a computing environment 103, an administrator computing device 106, and client device(s) 109, which are in data communication with each other via a network 113.

The network 113 includes, for example, the Internet, one or more intranets, extranets, wide area networks (WANs), local area networks (LANs), wired networks, wireless networks, other suitable networks, or any combination of two or more such networks. For example, such networks may comprise satellite networks, cable networks, Ethernet networks, telephony networks, and other types of networks.

The computing environment 103 can be a computing environment that is operated by an enterprise, such as a business or another organization. The computing environment 103 can also include or be described as a management computing environment of a management service that is employed or utilized by an enterprise. The computing environment 103 includes a computing device, such as a server computer that provides computing capabilities. Alternatively, the computing environment 103 can employ multiple computing devices that are arranged in one or more server banks or computer banks, or other arrangements. In one example, the computing devices can be located in a single installation. In another example, the computing devices for the computing environment 103 can be distributed among multiple different geographical locations. In one case, the computing environment 103 includes multiple computing devices that together can form a hosted computing resource, a grid computing resource, and/or any other distributed computing arrangement. Additionally, the computing environment 103 can operate as an elastic computing resource where the allotted capacity of computing-related resources, such as processing resources, network resources, storage resources, or other computing-related resources can vary over time. In other examples, the computing environment 103 can include or be operated as one or more virtualized computer instances that can be executed to perform the functionality that is described herein.

Various systems and/or other functionality can be executed in the computing environment 103 according to various embodiments. Various applications can be executed in the computing environment 103. The components executed on the computing environment 103, for example, include a unified endpoint management (UEM) application 119, and other applications, services, processes, systems, engines, or functionality not discussed in detail herein. Moreover, the UEM application 119 can contain component applications such as a directory service 123, a kiosk management service, and other applications, services, processes, systems, engines, or functionality not discussed in detail herein, which can be executed by the computing environment 103.

Also, various data is stored in a data store 116 that is accessible to the computing environment 103. The data store 116 can be representative of a plurality of data stores 116, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 116, for example, is associated with the operation of the various applications and/or functional entities described below. The data stored in the data store 116 includes, for example, one or more user profiles 129, a refresh policy 133, one or more device states 143, a user authorization data set 146, one or more package files 149, a validation policy 153, and potentially other data. Moreover, the refresh policy 133 can contain data such as one or more device refresh conditions 136, a set of device data 139, and potentially other data.

The one or more user profiles 129 can include data associated with a user account, such as a clearance level, group and/or team information, and other user profile information. The one or more user profiles 129 can include access settings, such as authentication credentials, delegation settings (e.g., information about other users who can be provided access to the user profile 129 of a particular user), mail and document retention rules and/or policies, and/or other geographic access restrictions or limitations (e.g., information about certain locations and/or networks from which user profile 129 can be accessed). The one or more user profiles 129 can also include other account settings, such as biographical or demographic information about a user, password reset information, multi-factor authentication settings, and other data related to a user account as can be appreciated.

The one or more user profiles 129 can also contain information about user accounts in a user directory. User accounts can be maintained by the directory service 123. The user accounts can be associated with the administrator computing device 106 and/or one or more client devices 109 that are enrolled with the directory service 123. In some implementations, the kiosk management service 126 can rely upon a separate set of user account data or a user directory to determine whether to issue an authentication token to an application on behalf of the user. In other implementations, the one or more user profiles 129 is a user directory associated with the unified endpoint management application 119.

One or more user profiles 129 can include profile information about a user, authentication information about a user, applications that are installed on client devices 109 associated with the user, and other user information. For example, one or more user profiles 129 can include information about client devices 109 that are associated with a user account of the user, enterprise resources to which a particular user has access, such as email, calendar data, documents, media, applications, network sites, or other resources. The one or more user profiles 129 can also identify one or more user groups of which a particular user is a member, which can in turn define the access rights of the user to one or more enterprise resources as well as identify which applications should be deployed to a client device(s) 109 associated with the user. To this end, the one or more user profiles 129 can further identify one or more device identifiers that can uniquely identify client devices 109 that are associated with a user account of the user.

User profile 129 can further include a role within an organizational hierarchy. For example, a role can identify the user as a supervisor for certain other users and/or as reporting to another user in an organization. The clearance level can specify one of a plurality of clearance levels.

The refresh policy 133 can include conditions, guidelines, and/or procedures for reinstalling and/or updating the software and/or hardware of the one or more electronic devices in the kiosk. In some cases, the refresh policy can apply to all of the electronic devices registered to the UEM application 119. The refresh policy 133 can require a determination of the device state 143. For example, the refresh policy 133 could require the one or more electronic devices to be in a checked-in state. In other embodiments, the refresh policy 133 can determine when to deploy the refresh payload based at least in part on the device refresh conditions 136. In another embodiment, the refresh policy 133 can be generated dynamically. For example, if the electronic devices of a kiosk have continuously received only a first refresh payload, the refresh policy 133 could specify all devices of the kiosk to only receive the first refresh payload. In other examples, the refresh policy can be generated dynamically based at least in part on the type of electronic device and/or the location of the kiosk containing the electronic device. In some instances, the refresh policy 133 can be modified by the administrator application 156 and/or an administrator using the client application 176. In other examples, the UEM application 119 can modify the refresh policy 133. In other examples, the refresh policy 133 could be modified by a user based at least in part on the user profile 129.

The one or more device refresh conditions 136 could be prerequisite conditions prior to the refresh payload being deployed and/or applied to the electronic device. In some instances, the device refresh condition 136 could be at least one of a battery level, an idle time, a device temperature, a storage space, and/or a security provision of the electronic device. The device refresh conditions 136 could refer to software conditions of the electronic device, such as software crashes, application crashes, and/or detection of security vulnerabilities.

The set of device data 139 can include various information about the electronic device. In some embodiments, the set of device data 139 can represent the information about the hardware contained in the electronic device. For example, the set of device data 139 can represent information such as sensors, storage devices, networking devices, processors, memory, etc. In some embodiments, the set of device data 139 can represent the type, make, and model of the electronic device. In some other embodiments, the set of device data 139 can represent the installed software applications and/or the one or more operating systems. In some embodiments, the set of device data 139 can represent stored filed, usage history, the device state 143, and/or electronic device settings.

The one or more device states 143 can represent the status of the electronic device. The device state 143 can be at least one an unavailable state, an allocated state, a checked-in state, a checked-out state, an idle state, an in-use state, an in-service state, an out of service state, and other similar states. For example, when the electronic device is available and in the kiosk, the device state 143 can be a checked-in state. For example, when the electronic device is reserved online, the electronic device could be in the idle state and/or the allocated state. In other examples, when the device is loaned out to a user, the electronic device can be in the in-service state and/or checked-out state. In some embodiments, the kiosk and the administrator application 156 could display different device states 143. For example, the kiosk could display the device state 143 of the electronic device as checked-out while the administrator application 156 displays the electronic device in an in-use state. In some instances, the one or more device states 143 can be used to determine the location of the electronic device. In other embodiments, the device state 143 can be used to determine when to deploy a package file 149 and/or a refresh payload to the electronic device.

The user authorization data set 146 can represent a set of information that verifies and authorizes the user profile 129 of the user requesting the electronic device. In some embodiments, the user authorization data set 146 can comprise the user credentials, access level, and roles. In some embodiments, the user authorization data set 146 can be used to determine the type of electronic device the user can request. In other instances, the user authorization data set 146 comprise the office and/or work location of the user. For example, the user authorization data set 146 can contain information that a user works in "Office A." The information could be one step in verifying the user. In the other examples, the user authorization data set 146 can be used to personalize the package file 149.

The one or more package files 149 can include at least one of operating system updates, security patches, applications/ software, and settings/configurations. In some examples, the package files 149 can be modified by the user requesting the electronic device, the administrator application, the directory service, and/or the UEM application 119. In another example, the package file 149 can be a predefined file. In some embodiments, the package file 149 can be a provisioning package file. For example, the provisioning package file can be configured to install an application, a certificate, and/or a profile on the electronic device. In some examples, the package file 149 can be generated based at least in part on the user profile 129 of the user requesting the electronic device. For example, the package file 149 for an administrator of the organization could contain the administrator application 156 whereas a user without the administrator role would not get the administrator application 156 as a part of their package file on the requested electronic device. The package file can be deployed to the electronic device by the kiosk management service and/or the UEM application 119.

In some examples, the package file could be deployed only when the electronic device is in the allocated state and/or the checked-out state.

The validation policy 153 can represent the policies for validating the status of the electronic device. For example, the validation policy 153 could verify the version of the software on the electronic device, where if the software is not up to date, the validation policy 153 could flag the electronic device for maintenance. In some instances, the validation policy 153 can determine if the electronic device is operating and/or functioning to the set standards. For example, set standards can be security standards, compliance standards based at least in part on the electronic device usage (e.g., meets HIPAA standards if used for health records or medical information, state related data privacy standards such as California Consumer Privacy Act, etc.). and performance standards (e.g., resource usage, memory usage, battery life, etc.). In some examples, the validation policy 153 can be used to validate a user when requesting the electronic device. For example, the validation policy 153 could be used to verify the username and password and/or completion of a multi-factor authentication process.

The unified endpoint management application 119 can manage and/or oversee the operation of multiple client devices 109 that are enrolled within a device management framework. For example, an employer may operate the UEM application 119 to ensure that the client devices 109 of its employees are operating in compliance with various compliance rules. In other examples, the UEM application 119 may be operated to ensure that the electronic devices loaned out by the kiosk management service 126 are operating in compliance with various compliance rules and/or validation policies 153. By ensuring that the client devices 109 and/or the electronic devices are operated in compliance with the compliance rules and/or validation policies 153, the employer may control and protect access to various data as well as the usage of devices that are potentially issued by the employer. The UEM application 119 may also facilitate access to email, calendar data, contact information, documents, or other enterprise data to which an enterprise may wish to provide access by users via client devices 109.

The directory service 123 can serve as a network service that identifies, organizes, and process access to enterprise and/or organization resources. In some embodiments, the directory service 123 may store information about the electronic devices, user accounts, access privileges, and other enterprise and/or organization related resources. The directory service 123 can also manage user credentials that secure the electronic devices. The directory service 123 can send a token to the kiosk management service 126 and/or the UEM application 119 upon a request for the one or more electronic device. In some examples, the token could be used for authorization and/or authentication of the UEM application 119. In some instances, the directory service 123 can be used to determine the identity of a device using the device-identifier. The directory service 123 can use the device-identifier to assign and/or deploy the package files 149. In other instances, the directory service 123 can be used to manage and provision the package files 149.

The kiosk management service 126 can manage the physical kiosk and the electronic device loaning operations. In some examples, the kiosk management service 126 can receive the request for the electronic device and/or the request to return the electronic device. Additionally, the kiosk management service 126 can monitor the requests for an electronic device made through the web browser user interface. The kiosk management service 126 can allocate electronic devices for online reservations. The kiosk management service 126 can send API requests to the directory service 123 and/or the UEM application 119. The kiosk management service 126 can track the electronic devices registered to a kiosk. In other instances, the kiosk management service 126 can manage the inventory of the kiosk. For example, if a user is past the loan-out period, the kiosk management service 126 can send an email and/or a notification to the user and/or the electronic device to request the return of the electronic device. In other instances, the kiosk management service 126 can alert the UEM application 119 and/or the administrator application 156 if the kiosk has any issues (e.g., network issues, failure to dispense an electronic device, malfunction, etc.). Additionally, the kiosk management service 126 can monitor the state of the electronic device and modify the state upon loaning/returning the electronic device. The kiosk management service 126 can also deploy package files 149 and/or refresh payloads. In some instances, the kiosk management service 126 may be directed to deploy package files 149 and/or refresh payloads by the directory service 123 and/or the UEM application 119.

The administrator computing device 106 is representative of a plurality of client devices that can be coupled to the network 113. The administrator computing device 106 can comprise, for example, a processor-based system such as a computer system. Such a computer system can be embodied in the form of a desktop computer, a laptop computer, a personal digital assistant, a cellular telephone, a smartphone, a set-top box, a music player, a web pad, a tablet computer system, a game console, an electronic book reader, or any other device with like capability. In some embodiments, the administrator computing device 106 can represent a device that is owned or issued by the enterprise to a user, or a device that is owned by the user. In some embodiments, the administrator computing device 106, when provisioned, can be enrolled with the unified endpoint management application 119 as a managed device of the enterprise.

The administrator computing device 106 can include a display 159a that comprises, for example, one or more devices such as liquid crystal display (LCD) displays, gas plasma-based flat panel displays, organic light emitting diode (OLED) displays, LCD projectors or other types of display devices.

The administrator computing device 106 can execute various applications, such as an administrator application 156 and/or other applications. In some embodiments, the administrator computing device 106 could represent a device executing a management component and/or a device that is enrolled within a device management framework associated with an enterprise. In some other embodiments, the administrator computing device 106 represents a device associated with a user who can be external to the enterprise or a device that is not enrolled within the device management framework of the enterprise. The administrator application 156 can include, for example, a browser, a dedicated application, or other executable, and the user interface 163a can include a network page, an application screen, or other user mechanism for obtaining user input. The administrator computing device 106 can be configured to execute applications beyond the administrator application 156 such as email applications, social networking applications, word processors, spreadsheets, or other applications. However, administrator computing device(s) 106 can be configured to operate in a "headless" configuration without a display 159a. In these configurations, the user interface 163a could be presented to another device over the network 113 (e.g., via the remote desktop protocol (RDP), secure shell (SSH) protocol, etc.).

The administrator application 156 can allow the administrator to manage the one or more electronic devices. In some examples, the administrator application 156 could allow the administrators to communicate with the electronic devices. In other examples, the administrator application 156 could allow the administrator to extend the check-out period of the electronic device for a user. In other embodiments, the administrator application 156 could allow the administrator to send a refresh payload to the one or more electronic devices. In another embodiment, the administrator application 156 can be used to manage the online reservation system, the kiosks, and other administrators. In other instances, the administrator application 156 could be configured to execute or perform its functions without user intervention. For example, the administrator application 156 could be configured to use machine-learning, artificial intelligence, or similar approaches to perform its functions.

The client device(s) 109 is representative of a plurality of client devices that can be coupled to the network 113. The client device(s) 109 can comprise, for example, a processor-based system such as a computer system. Such a computer system can be embodied in the form of a desktop computer, a laptop computer, a personal digital assistant, a cellular telephone, a smartphone, a set-top box, a music player, a web pad, a tablet computer system, a game console, an electronic book reader, or any other device with like capability. In some embodiments, the client device(s) 109 can represent a device that is owned or issued by the enterprise to a user, or a device that is owned by the user. The client device(s) 109, when provisioned, can be enrolled with the unified endpoint management application 119 as a managed device of the enterprise. The client device(s) 109 can include one or more displays 159b, such as liquid crystal displays (LCDs), gas plasma-based flat panel displays, organic light emitting diode (OLED) displays, electrophoretic ink ("E-ink") displays, projectors, or other types of display devices. In some instances, the display 159b can be a component of the client device(s) 109 or can be connected to the client device(s) 109 through a wired or wireless connection. In some instances, the client device(s) 109 can include one or more sensors 166, such as a location detection unit, an accelerometer, a gyroscope, a camera, fingerprint sensor, iris sensor, and other suitable sensors.

In some embodiments, the sensor 166 can be used for capturing the device-identifier of the client device(s) 109 and/or the electronic device. Additionally, in some examples, the sensor 166 can be used for dynamically determining the layout of the user interfaces rendered on the display 159b. For instance, text and/or graphics relocated based at least in part on a detected orientation (e.g., portrait or landscape) of the display 159b on the client device(s) 109. The text and graphics can be dynamically relocated based on detected gestures (via a touchscreen display) on the display 159b. The text and graphics can be dynamically relocated in order to create viewable area in the display 159b for other related text and/or graphics. In some examples, the sensors 166 could be used to capture a biometric marker of the user. In some examples, sensors can be location detection units such as GPS to locate the electronic device.

Various data is stored in a client data store 169 that is accessible to the client device(s) 109. The data stored in the client data store 169 is associated with the operation of the various applications or functional entities described below.

This data can include enterprise device configuration data 173 and potentially other data.

The enterprise device configuration data 173 can be security policies, software policies, network settings, and permissions for the electronic device that are preconfigured. In some examples, the network settings can include the Wi-Fi settings and/or VPN settings for the enterprise. In other embodiments, the security policies can be electronic device login requirements, idle settings, and encryption settings. The software policies could control which applications can be installed by the user. The software policies could further control which applications are accessible by the user. The access to applications on the electronic device could vary based at least in part on the user profile 129. The permissions could control actions and settings the user is allowed to change on the client device(s) 109 and/or the electronic device.

The client device(s) 109 can execute various applications, such as a client application 176, an agent service 179, and/or other components. In this respect, the client device(s) 109 represents a device a device that is enrolled within a device management framework associated with an enterprise. The client device(s) 109 represents a device associated with a user who can be external to the enterprise or a device that is not enrolled within the device management framework of the enterprise. The client application 176 can include, for example, a browser, a dedicated application, or other executable, and the user interface 163a can include a network page, an application screen, or other user mechanism for obtaining user input. The client device 106 can be configured to execute applications beyond the client application 176 such as email applications, social networking applications, word processors, spreadsheets, or other applications. However, client device(s) 109 can be configured to operate in a "headless" configuration without a display 159b. In these configurations, the user interface 163b could be presented to another device over the network 113 (e.g., via the remote desktop protocol (RDP), secure shell (SSH) protocol, etc.).

The agent service 179 can allow an administrator to remotely communicate, push updates, monitor, and assist users with the electronic device. The administrator could initiate a chat session using the agent service 179 on the electronic device. In some embodiments, the administrator could remotely send the package file 149 to the electronic device. In some other embodiments, the administrator could monitor the status and location of the electronic device. In some instances, the administrator could remote into the electronic device to assist users with issues or problems on the electronic device.

The UEM application 119 can be executed on the client device(s) 109 to oversee, monitor, and/or manage at least a portion of the resources for the client device(s) 109. The UEM application 119 can be executed by the client device(s) 109 automatically upon startup of the client device(s) 109. Additionally, the UEM application 119 can run as a background process in the client device(s) 109. In other words, the UEM application 119 can execute and/or run without user intervention. Additionally, the UEM application 119 can communicate with the directory service 123 and/or the kiosk management service 126 to facilitate the management of the client device(s) 109 by the directory service 123 and/or the kiosk management service 126.

Next, a general description of the operation of the various components of the networked environment 100 is provided. To begin, an enterprise, business, and/or organization can provide access to one or more electronic devices to the member of the enterprise, business, and/or organization. The member can be a user, an employee, a client, etc. The electronic devices can be offered through an IT team of the enterprise/organization or using a kiosk. The kiosk can be used to manage the electronic devices though allocation, distribution, and return of the electronic devices. The kiosk can be managed by the kiosk management service 126. The kiosk can offer a plurality of electronic devices and a plurality of types of electronic devices (e.g., desktop computer, a laptop computer, a personal digital assistant, a cellular telephone, a smartphone, a set-top box, a music player, a web pad, a tablet computer system, a game console, an electronic book reader, etc.). Additionally, the kiosk could contain one or more sensors to capture the device identifier of the electronic device. In some instances, the sensor could be used to scan the enterprise issued badge/identifier of the user requesting the electronic device.

In order to access the electronic device, the user begins by requesting the electronic device. In order to request the electronic device, the user can login using enterprise issued credentials, enterprise issued badge/identifier, and/or by typing in a pre-generated code. The credentials can be a username and password, username and a one-time password sent to the user, etc. The badge/identifier can be an employee/member issued ID card, an RFID chip, a HID card, etc. The pre-generated code can be generated by reserving the electronic device using the online reservation system. In some instances, the pre-generated code can be generated by the IT team or similar team of the enterprise. Once the user is authenticated, the user can request the one or more electronic devices and select the one or more types of electronic devices. In some instances, the user can request a plurality of types of electronic devices. In some instances, the user can be prompted to select a loan out period of time for the one or more electronic devices.

After the kiosk receives the request for an electronic device, the kiosk management service 126 can allocate the one or more electronic devices to the user. Then, the sensor in the kiosk can capture the device-identifier of the allocated ones of the one or more electronic devices. The device-identifier can be a serial number, an asset tag, or other similar alpha-numeric tracking string. The kiosk management service 126 can send the device-identifier to the directory service 123 for at least one of generating a package file 149, record keeping, and/or validating the request based at least in part on the validation policy 153.

Then, the directory service 123 can generate the package file to be deployed to the electronic device. The directory service 123 could generate a plurality of package files for the respective electronic devices. The package file 149 can contain one or more of operating systems, applications, settings, configurations, etc. The package file 149 can be modified by the user requesting the electronic device and/or the administrator. The administrator can be the IT team or a similar team of the enterprise.

Then, the directory service 123 can establish a secure connection with the kiosk and send the package file 149 to be deployed to the electronic devices. The kiosk can deploy the package file 149 to the one or more electronic devices. In some instances, the package file 149 can be deployed by the kiosk via a wired (e.g., USB, ethernet, etc.) and/or a wireless connection (e.g., Wi-Fi-, Bluetooth, etc.). Once the connection is established between the kiosk and the electronic device, the kiosk can initiate the deployment of the package file 149. The package file 149 can install the necessary files and configure the electronic device. Once the package file 149 is deployed, the kiosk can dispense the one or more electronic devices. Upon dispensing the electronic device, the kiosk can update the device state 143 of the one or more electronic devices.

In some examples, the user can return the device by placing the device back into the kiosk. In other embodiments, in order to return the electronic device, the user can request to return the device via the online reservation system, manually through the administrator, and/or through the kiosk via the kiosk management service 126. The kiosk and/or online reservation system can validate the user based at least in part on the user authorization data set 146. The user can insert and/or place the electronic device into the kiosk to initiate the return process. Once the device is inserted and/or placed in a slot on the kiosk, the kiosk can receive an indication of the electronic device transitioning from the checked-out state to the checked-in state. The kiosk management service 126 can alert the device manage system, the UEM application 119, and/or the directory service 123 of the electronic device transitioning to the checked-in state.

Then, the sensor in the kiosk can capture the device-identifier of the one or more electronic devices being returned. The device-identifier can be a serial number, an asset tag, or other similar alpha-numeric tracking string. The kiosk management service 126 can send the device-identifier to the directory service 123 for at least one of generating a refresh payload, record keeping, and/or validating the request based at least in part on the validation policy 153.

Then, the directory service 123 can establish a secure connection with the kiosk and send the refresh payload to be deployed to the one or more electronic devices. The kiosk can deploy the refresh payload to the one or more electronic devices. Once the refresh payload is deployed, the kiosk can update the state of the electronic device to at least one of the device states 143. In some examples, the kiosk can update the state of the one or more returned electronic devices to the checked-in state. In some instances, during the return process, the electronic device can be unenrolled from the device management system and/or the UEM application 119. In some instances, unenrolling the device from the device management system and/or the UEM application 119 can allow the device to be checked out again, repaired by the IT team, or be setup for other uses in the enterprise.

In some examples, the user could be returning the electronic device due to a fault or other issues. For example, the electronic device could lack sufficient memory or processing power to perform the task needed by the user. In some cases, the user can request to swap or change the electronic device. For example, the user can request a swap by returning the "Type A" electronic device in order to receive a "Type B" device. In some instances, the user can request the data, package file, settings, and/or configurations to be copied from the "Type A" electronic device to the "Type B" electronic device. In order to copy the data, the electronic device could be required to be in the checked-in state.

Figure 2A:
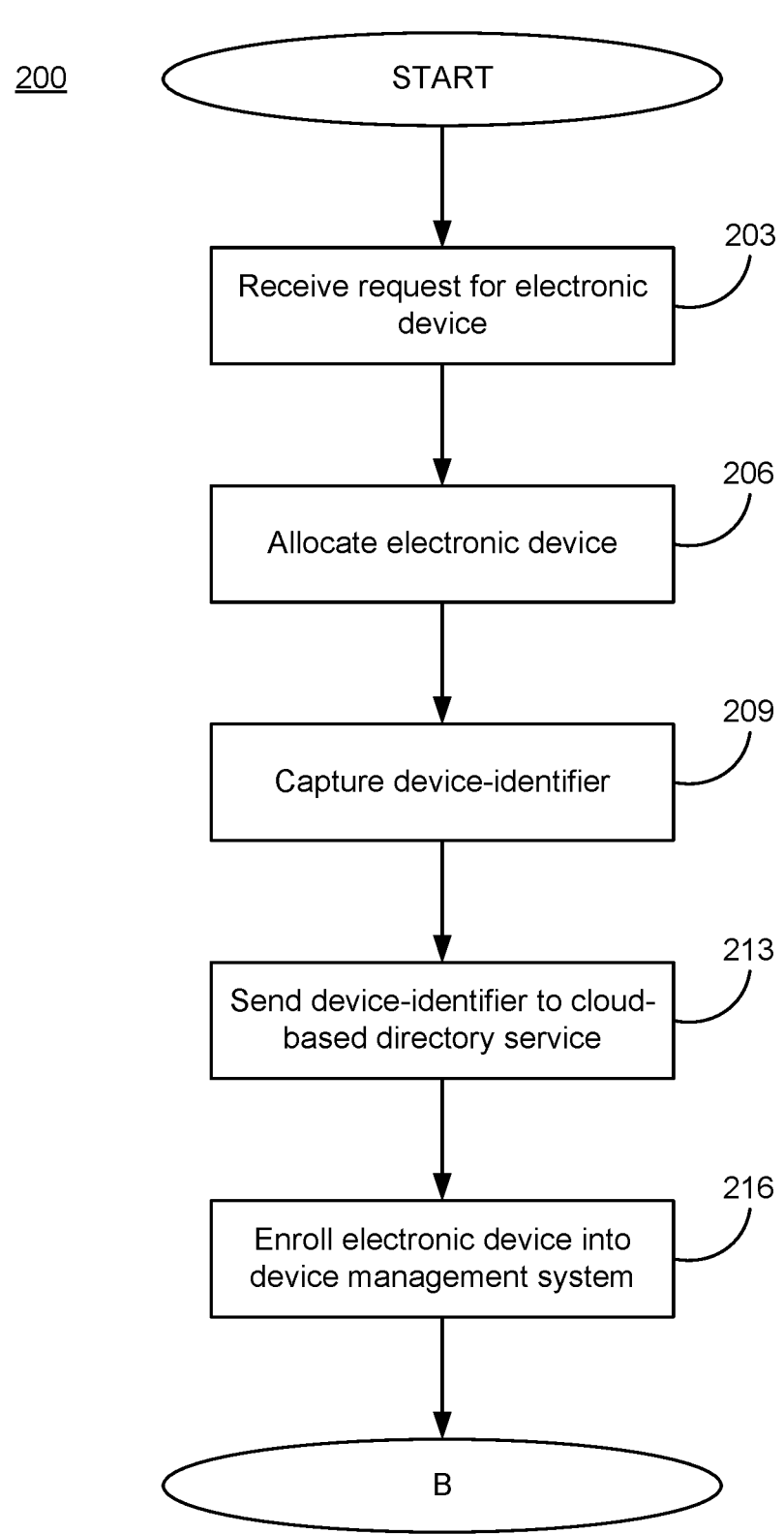
FIG. 2A is a flowchart illustrating one example of functionality implemented as portions of an application executed in a computing environment in the network environment of FIG. 1 according to various embodiments of the present disclosure.
Figure 2B:
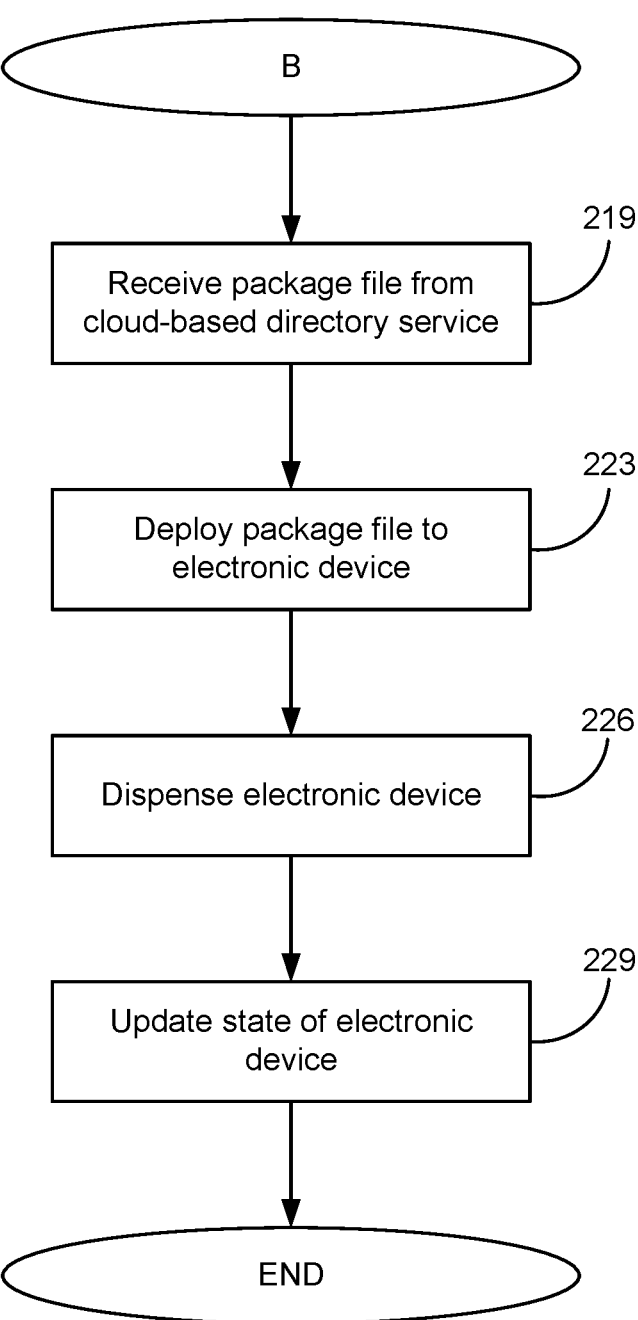
FIG. 2B is a flowchart illustrating one example of functionality implemented as portions of an application executed in a computing environment in the network environment of FIG. 1 according to various embodiments of the present disclosure.

Referring next to FIGS. 2A and 2B, shown is a flowchart that provides one example of the operation of a portion of the UEM application 119 according to various embodiments. It is understood that the flowchart of FIGS. 2A and 2B provides merely an example of the many different types of functional arrangements that can be employed to implement the operation of the depicted portion of the UEM application 119 as described herein. As an alternative, the flowchart of FIGS. 2A and 2B can be viewed as depicting an example of elements of a method implemented in the computing environment 103 (FIG. 1) according to one or more embodiments.

Beginning with block 203, the kiosk management service 126 of the unified endpoint management application 119 can receive a request for an electronic device. In some instances, the request for the electronic device can be received via the kiosk. In other embodiments, the request for the electronic device can be received via an online reservation system. For example, the user can use the client application 176 to request the electronic device. In some embodiments, the administrator application 156 can manually input a request for the electronic device. In some examples, the user can request a plurality of electronic devices.

At block 206, the kiosk management service 126 of the unified endpoint management application 119 can allocate the electronic device. In some embodiments, the allocation of the one or more electronic devices is based at least in part on the request for the one or more electronic devices. In some other embodiments, the allocation of the one or more electronic devices could be based at least in part on the online reservation. In other embodiments, the kiosk management service can allocate the one or more electronic devices based at least in part on a determination of an upcoming service and/or update for the one or more electronic devices.

At block 209, the kiosk management service 126 of the unified endpoint management application 119 can capture the device-identifier. The device-identifier can be a serial number, an asset tag, or other similar tracking numbers. In some instances, the device-identifier can be a barcode, QR code, or other scannable and/or capturable device-identifier. In some embodiments, the kiosk management service 126 can use a scanner to capture the device-identifier. In other examples, the device-identifier can be scanned using an RFID scanner. In some instances, the device-identifier can be based at least in part on the position of the electronic device in the kiosk. In some embodiments, the device-identifier could be input manually by a user or an administrator. In other examples, the device-identifier could be captured based on allocating the electronic device from an online reservation.

At block 213, the kiosk management service 126 of the unified endpoint management application 119 can send the device-identifier to the directory service 123. The device-identifier can be used to identify the electronic device. In some instances, the directory service 123 can alert the kiosk management service 126 of any errors and/or issues with the electronic device. Additionally, sending the device-identifier to the directory service 123 can allow the directory service 123 to keep accurate records about individual ones of the one or more electronic device.

At block 216, the kiosk management service 126 of the unified endpoint management application 119 can enroll the electronic device into a device management system. In some instances, the device management system can be the UEM application 119. In some embodiments, the electronic device can be enrolled based at least in part on the device-identifier. The device management system can be used to push over-the-air updates, provide remote support, install applications, sending message and/or notifications, and other IT related tasks. In some embodiments, the enrollment into the device management system or the UEM application 119 can be based at least in part on the device data 139.

At block 219, the kiosk management service 126 of the unified endpoint management application 119 can receive a package file 149 from the directory service 123. The package file 149 can be generated based at least in part on the device-identifier. In some instances, the package file 149 can be generated based at least in part on the device data 139. In other embodiments, the package file 149 can be generated based at least in part on the user profile. In some examples, the package file 149 can be modified by the user during the request for the electronic device.

At block 223, the kiosk management service 126 of the unified endpoint management application 119 can deploy the package file to the electronic device. In some instances, the package file 149 can be deployed to the plurality of electronic devices requested. Once the package file 149 is deployed to the requested electronic device, the kiosk can dispense the electronic device. In some instances where the plurality of electronic devices are requested, the kiosk could dispense the electronic devices all together, upon completion of the package file 149, and/or in the order the electronic devices were requested. In some other embodiments, the package file 149 can be deployed after the one or more electronic devices are dispensed. In some instances, the electronic device can receive a plurality of package files 149.

At block 226, the kiosk management service 126 of the unified endpoint management application 119 can dispense the electronic device. In some instances, the kiosk management service 126 can dispense a plurality of electronic devices. In some embodiments, the kiosk management service 126 can alert the user when the electronic device is dispensed and/or ready to be picked-up. In other embodiments, the kiosk management service 126 can dispense the one or more electronic devices in a customized order, one-by-one, and/or all together.

At block 229, the kiosk management service 126 of the unified endpoint management application 119 can update the state of the electronic device. In some instances, the kiosk management service 126 can update the state of the plurality of electronic devices. In some examples, the state can be updated on at least one or more of the kiosk, the device management system, the UEM application 119, the directory service 123. In other examples, the kiosk management service 126 can display a plurality of device states 143 for the individual ones of the electronic devices. In other examples, the device state 143 can vary based at least in part on the application and/or system. For example, the kiosk can display a checked-out state while the administrator application can display an in-use state.

Figure 3A:
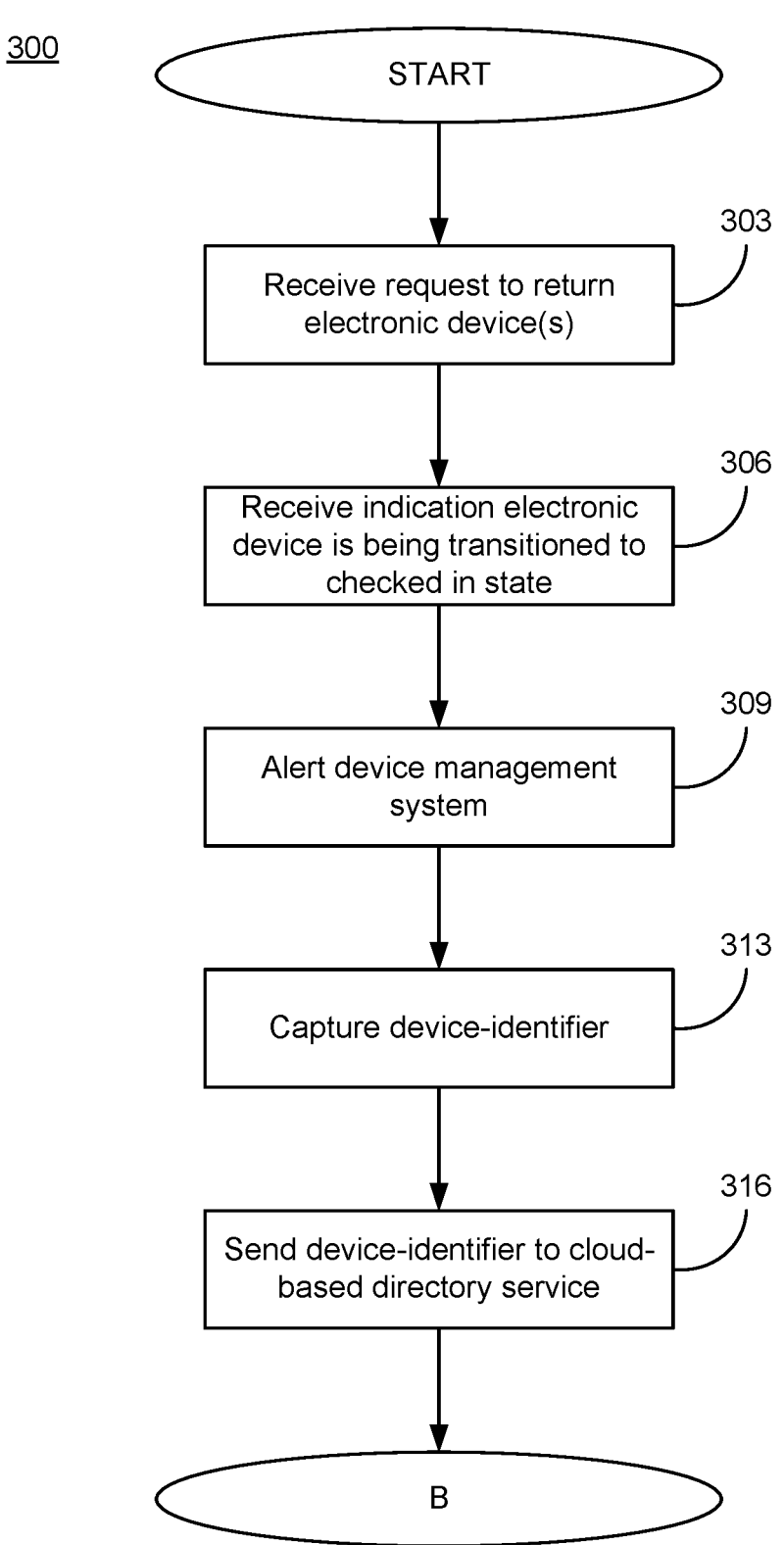
FIG. 3A is a flowchart illustrating one example of functionality implemented as portions of an application executed in a computing environment in the network environment of FIG. 1 according to various embodiments of the present disclosure.
Figure 3B:
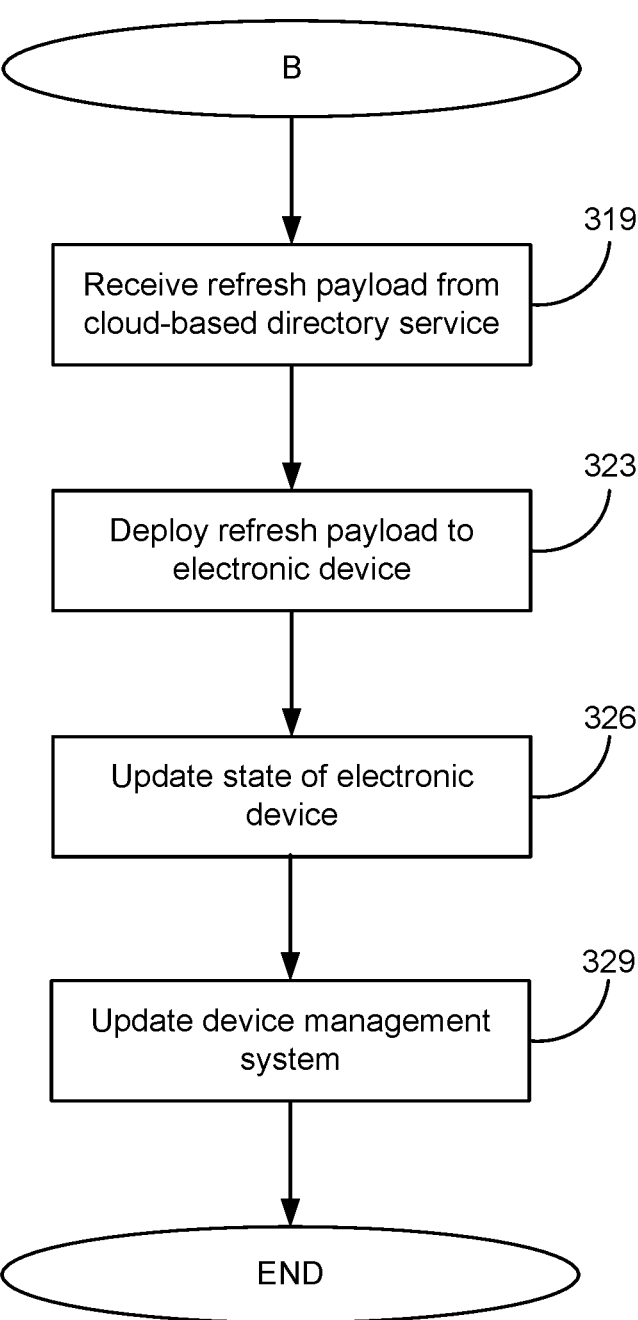
FIG. 3B is a flowchart illustrating one example of functionality implemented as portions of an application executed in a computing environment in the network environment of FIG. 1 according to various embodiments of the present disclosure.

Referring next to FIGS. 3A and 3B, shown is a flowchart that provides one example of the operation of a portion of the UEM application 119 according to various embodiments. It is understood that the flowchart of FIGS. 3A and 3B provides merely an example of the many different types of functional arrangements that can be employed to implement the operation of the depicted portion of the UEM application 119 as described herein. As an alternative, the flowchart of FIGS. 3A and 3B can be viewed as depicting an example of elements of a method implemented in the computing environment 103 (FIG. 1) according to one or more embodiments.

Beginning at block 303, the kiosk management service 126 of the unified endpoint management application 119 can receive a request to return the electronic device. In some instances, the request can be for returning a plurality of electronic devices. In some embodiments, the request to return the one or more electronic devices can be received via the kiosk. In other embodiments, the request to return the one or more electronic devices can be received via the online reservation system. For example, the user can use the client application 176 to request the return for the one or more electronic devices. In some embodiments, the administrator application 156 can manually input the request for returning the one or more electronic device.

At block 306, the kiosk management service 126 of the unified endpoint management application 119 can receive an indication that the electronic device is being transitioned to a checked-in state. In some instances, the kiosk can receive the electronic device to trigger the transition to the checked-in state. In some instances, the kiosk management service 126 can receive an indication that a plurality of electronic devices are being returned, therefore receiving an indication that a plurality of electronic devices are transitioning to the checked-in state. The indication can be triggered by the user physically returning the electronic device. For example, the user can insert the electronic device in a slot or position in the kiosk to indicate the electronic device is returned and transition the electronic device to a checked-in state. In other examples, the administrator can use the administrator application 156 to manually indicate to the kiosk management service 126, the return of the one or more electronic devices. For example, if the user experienced issues with the electronic device, the user could have returned the device to the IT team or another similar team where the team could have indicated, using the administrator application 156, the return of the electronic device.

At block 309, the kiosk management service 126 of the unified endpoint management application 119 can alert the device management system of the checked-in state of the electronic device. In some instances, the kiosk management service 126 can alert the device management system of the checked-in state of the plurality of electronic devices. In some embodiments, the kiosk management service 126 can indicate the checked-in state to the directory service 123. The kiosk management service 126 can indicate to the UEM application 119 and/or the directory service 123 about the checked-in state of the one or more electronic devices individually and/or in a batch.

At block 313, the kiosk management service 126 of the unified endpoint management application 119 can capture the device-identifier of the electronic device transitioning from the checked-out state to the checked-in state. The device-identifier can be a serial number, an asset tag, or other similar tracking numbers. In some instances, the device-identifier can be a barcode, QR code, a RFID chip, or other scannable and/or capturable device-identifier. In some embodiments, the kiosk management service 126 can use a scanner to capture the device-identifier. In other examples, the device-identifier can be scanned using an RFID scanner. In some instances, the device-identifier can be based at least in part on the position of the electronic device in the kiosk. In some embodiments, the device-identifier could be input manually by a user or an administrator.

At block 316, the kiosk management service 126 of the unified endpoint management application 119 can transmit the device-identifier to the directory service 123. In some instances, the kiosk management service 126 can transmit the device-identifier of the returned electronic device in order for the directory service to prepare a refresh payload. In some other embodiments, the directory service 123 can update the records related to the individual ones of electronic devices.

At block 319, the kiosk management service 126 of the unified endpoint management application 119 can establish a secure connection with the directory service 123 to receive a refresh payload. In some instances, the directory service 126 could send a plurality of refresh payloads. The refresh payload allows the kiosk management service 126 to restore the electronic device to a predetermined default state. For example, the refresh payload could be a preconfigured image to be installed on the electronic device that gives the user a refreshed out-of-the-box-like experience similar to the initial setup process of a new electronic device. The refresh payload could contain a plurality of operating systems, applications, settings, and/or configurations. In some embodiments, the refresh payload could be based at least in part on the device-identifier.

At block 323, the kiosk management service 126 of the unified endpoint management application 119 can deploy the refresh payload to the electronic device. In some instances, the refresh payload can be deployed to the plurality of electronic devices returned. In some embodiments, deploying the refresh payload could wipe user data, reinstall the one or more operating systems, delete applications, and/or install system updates. In some instances, the refresh payload can be deployed to an electronic device that is in a checked-out state. For example, if the electronic device is lost or stolen, the directory service 123 can request the kiosk management service 126 to deploy the refresh payload.

At block 326, the kiosk management service 126 of the unified endpoint management application 119 can update the state of the electronic device to the checked-in state. The kiosk management service 126 can update the availability of the electronic device on the kiosk. The kiosk management service 126 can update the availability of the electronic device on the online reservation system.

At block 329, the kiosk management service 126 of the unified endpoint management application 119 can update the device management system. In some instances, the kiosk management service 126 can update the state of the plurality of electronic devices that were returned. In some examples, the state can be updated on at least one or more of the kiosk, the device management system, the online reservation system, the UEM application 119, and/or the directory service 123. In other examples, the kiosk management service 126 can display a plurality of device states 143 for the individual ones of the electronic devices. In other examples, the device state 143 can vary based at least in part on the application and/or system. For example, the kiosk can display a checked-in state while the administrator application can display an out-of-service state.

FIGS. 4A-4E depict various examples of scenarios where a user could begin a request for an electronic device according to various embodiments of the present disclosure. In each of these examples, a user can login to request one or more electronic devices. For example, a user could request a "Type A" electronic device for a duration of "10 Days" which is dispensed by the kiosk.

Referring to FIGS. 4A-4E, shown is a user interface diagram 400, 403, 406, 409, and 413, displayed on a display of the electronic device checkout kiosk. In some instances, the user interface can be rendered on the display by a web browser. In other instances, the user interface can be rendered and displayed on a dedicated application, a mobile application, or other related environments. The user interface represents an application to request an electronic device.

Figures 4A, 4B:
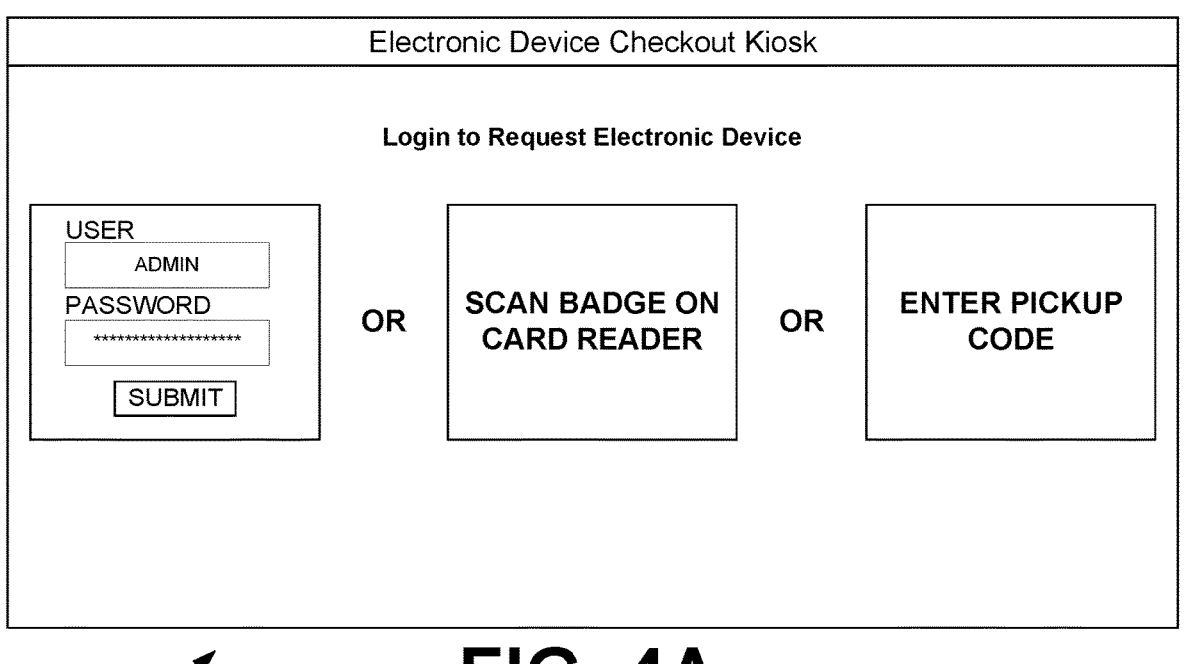
FIG. 4A is a user interface diagram according to various embodiments of the present disclosure.
FIG. 4B is a user interface diagram according to various embodiments of the present disclosure.

With reference to FIG. 4A, the user interface diagram 400 provides affordances for the user to input credentials, (e.g., username and password, physical security key, etc.) or enter a generated pick-up code to request one or more electronic devices. The user interface of the kiosk can be used to input the requested credentials or the pickup code. Once the credentials or the pickup code is entered, the user can click the "Submit" button to submit the credentials for authentication. In some examples, the credentials can be based at least in part on the user profile 129. In some embodiments, the user can be authenticated based at least in part on the user authorization data set 146.

Continuing the example of FIG. 4A, reference is now made to FIG. 4B, which illustrates another example user interface 403 that can be rendered on the electronic device checkout kiosk. The user interface 403 shown in FIG. 4B displays the one or more types of electronic devices available in the kiosk. In some embodiments, the user interface can display an exemplary picture of the type of electronic device. For example, the user interface in FIG. 4B displays two types of laptop computers. In other examples, the user interface allows the user to select the type of electronic device to receive the device data 139. In some embodiments, the kiosk could represent availability of the type of device in a table, list, and/or a visual form with check marks or other similar marks. For example, the user interface in FIG. 4B displays a visual representation of the kiosk where the top row represents availability of "Type A" electronic devices and the bottom row represents the availability of the "Type B" electronic devices. There are four "Type A" electronic devices available and three "Type B" electronic devices available in this example. The user can cancel the request by clicking the "Cancel" button. In some examples, pressing the "Cancel" button can redirect the user to the main menu. In other examples, pressing the "Cancel" button can redirect the user to the previous page. The user can select an available electronic device and press the "Next" button to proceed to the next step of requesting the electronic device. In some embodiments, there could be a "Log Out" button. The user can terminate the session by clicking the "Log Out" button. In some instances, clicking the "Log Out" button could redirect the user to the user interface of FIG. 4A.

Continuing the example of FIGS. 4A and 4B, reference is now made to FIG. 4C, which illustrates another example user interface 406 that can be rendered on the electronic device checkout kiosk. The user interface 406 shown in FIG. 4C displays a button representing the period of time for the duration of the electronic device rental. In some embodiments, the user can select the period of time from a list, a button selection, a table, or other similar method. In some embodiments, the user can input a duration for the rental. For example, if the user wanted to request the electronic device for 30 days, the user could specify the checkout duration. The user can cancel the request by clicking the "Cancel" button. In some examples, pressing the "Cancel" button can redirect the user to the main menu. In other examples, pressing the "Cancel" button can redirect the user to the previous page. In some examples, there could be a "Back" button to redirect the user to the previous page to make modifications. The user can select the time period and press the "Next" button to proceed to the next step of requesting the electronic device. In some embodiments, there could be a "Log Out" button. The user can terminate the session by clicking the "Log Out" button. In some instances, clicking the "Log Out" button could redirect the user to the user interface of FIG. 4A.

Continuing the example of FIG. 4A-4C, reference is now made to FIG. 4D, which illustrates another example user interface 409 that can be rendered on the electronic device checkout kiosk. The user interface 409 shown in FIG. 4D displays the "Terms and Conditions" for checking out the electronic device. The "Terms and Conditions" can be preset by the enterprise. In some instances, the "Terms and Conditions" could be modified by the administrator. The user can cancel the request by clicking the "Cancel" button. For example, the user can disagree with the terms by clicking the "Cancel" button which would cancel the request. In some examples, pressing the "Cancel" button can redirect the user to the main menu. In other examples, pressing the "Cancel" button can redirect the user to the previous page. In some examples, there could be a "Back" button to redirect the user to the previous page which could allow the user to make modifications. The user can read the "Terms and Conditions" and press the "Agree" button to proceed to the next step of requesting the electronic device.

Figure 4E:
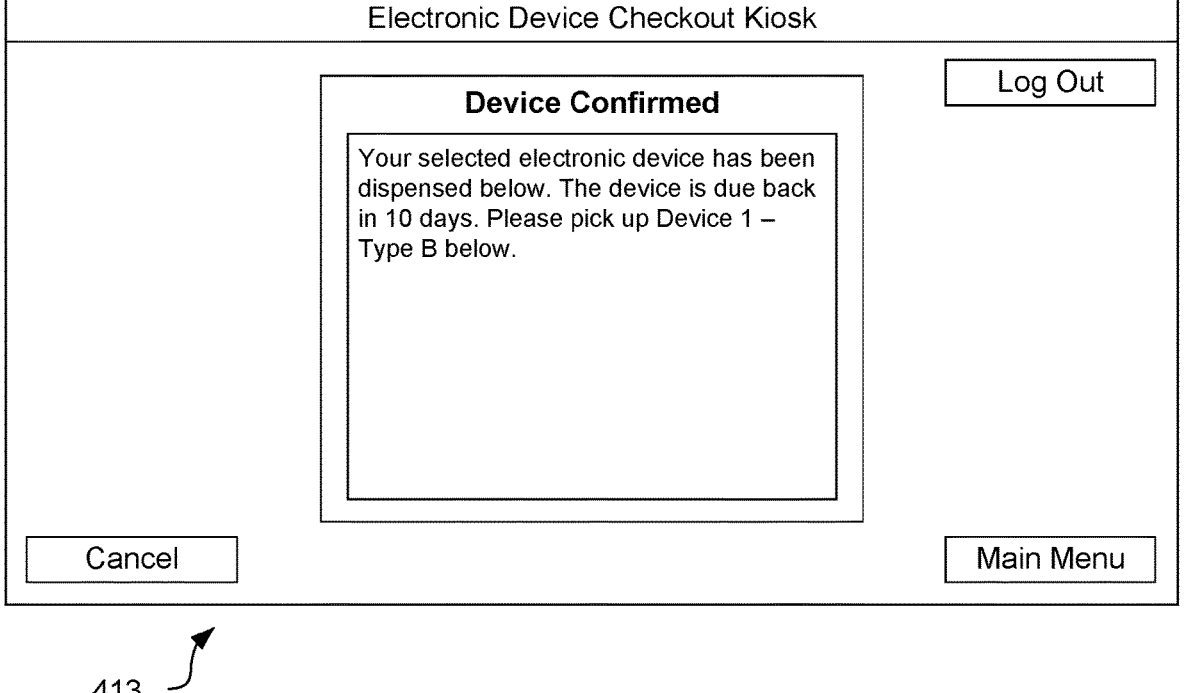
FIG. 4E is a user interface diagram according to various embodiments of the present disclosure.

Continuing the example of FIG. 4A-4D, reference is now made to FIG. 4E, which illustrates another example user interface 413 that can be rendered on the electronic device checkout kiosk. The user interface 413 shown in FIG. 4E displays a message. In some instances, the user interface 413 can display a notification. For example, the message, alert, and/or notification can inform the user the electronic device request is completed, and the device is dispensed. In some instances, the message, alert, and/or notification can further inform the user of the checkout duration and a return date. In some embodiments, the message, alert, and/or notification can inform the user of the type of electronic device and the quantity of electronic devices checked out. The user can cancel the request by clicking the "Cancel" button. In some examples, pressing the "Cancel" button can redirect the user to the main menu. In other examples, pressing the "Cancel" button can redirect the user to the previous page. In some examples, there could be a "Back" button to redirect the user to the previous page which could allow the user to make modifications. The user can terminate the session by clicking the "Log Out" button. In some instances, clicking the "Log Out" button will redirect the user to the user interface of FIG. 4A. The user can navigate to the user interface 403 displaying the main menu of the electronic device checkout kiosk by clicking the "Main Menu" button. In some instances, clicking the "Main Menu" button will redirect the user to the user interface of FIG. 4B.

FIGS. 5A-5E depict various examples of scenarios where a user could begin a request for an electronic device according to various embodiments of the present disclosure. In each of these examples, a user is able to login in on a client application to request one or more electronic devices. For example, a user could request a "Type A" electronic device for a duration of "10 Days" which is allocated to the user to be picked up at the kiosk by entering a pickup code.

Referring to FIGS. 5A-5E, shown is a user interface diagram 500, 503, 506, 509, and 513, displayed on a display 159*b* (FIG. 1) of the client device(s) 109 (FIG. 1). In some instances, the user interface 163*b* can be rendered on the display 159*b* by a web browser. In other instances, the user interface 163*b* can be rendered and displayed on a dedicated application, a mobile application, or other related environments. The user interface 163*b* represents an application to request one or more electronic devices. The user interface 163*b* can be rendered by the client application 176 (FIG. 1).

Figure 5A:
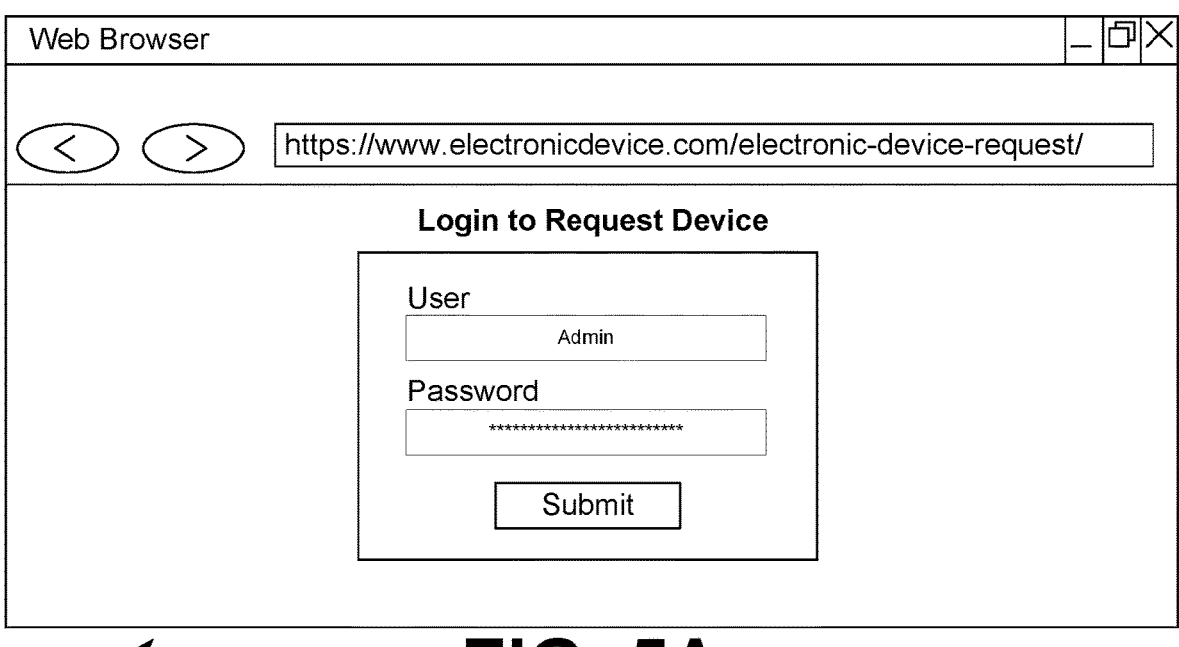
FIG. 5A is a user interface diagram according to various embodiments of the present disclosure.

With reference to FIG. 5A, the user interface diagram 500 provides affordances for the user to input credentials, (e.g., username and password, physical security key, etc.) to request the one or more electronic devices. The user interface of the web browser can be used to input the requested credentials. Once the credentials are entered, the user can click the "Submit" button to submit the credentials for authentication. In some examples, the credentials can be based at least in part on the user profile 129. In some embodiments, the user can be authenticated based at least in part on the user authorization data set 146.

Figure 5B:
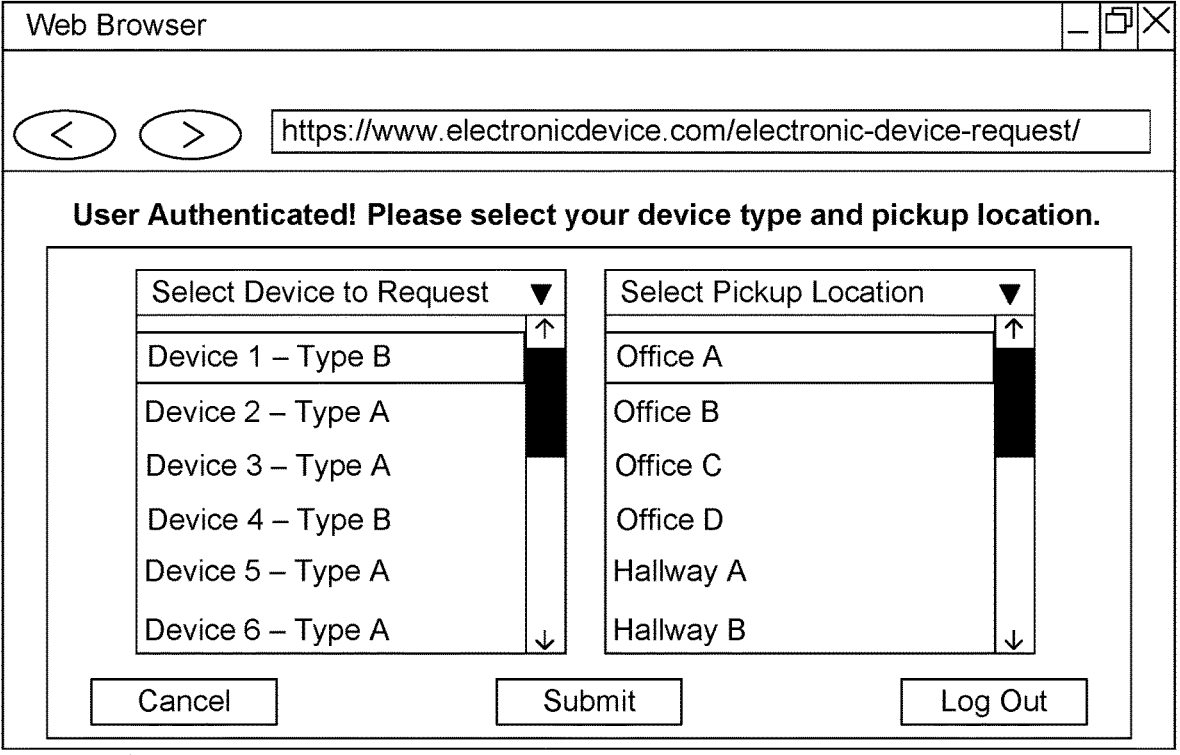
FIG. 5B is a user interface diagram according to various embodiments of the present disclosure.

Continuing the example of FIG. 5A, reference is now made to FIG. 5B, which illustrates another example user interface 503 that can be rendered on the client device(s) 109. The user interface 503 shown in FIG. 4B displays the one or more types of electronic devices available. In some embodiments, the user interface can display an exemplary picture of the type of electronic device. In other examples, the user interface allows the user to select the type of electronic device to receive the device data 139. In some embodiments, the web browser or the client application 176 could represent availability of the type of device in a table, list, and/or a visual form with check marks or other similar marks. For example, the user interface in FIG. 5B displays a list of available devices. The user interface in FIG. 5B also allows the user to select a pickup location for the electronic device. The user can cancel the request by clicking the "Cancel" button. In some examples, pressing the "Cancel" button can redirect the user to the main menu. In other examples, pressing the "Cancel" button can redirect the user to the previous page. The user can select an available electronic device and press the "Next" button to proceed to the next step of requesting the electronic device. The user can terminate the session by clicking the "Log Out" button. In some instances, clicking the "Log Out" button will redirect the user to the user interface of FIG. 5A.

Figures 5C, 5D:
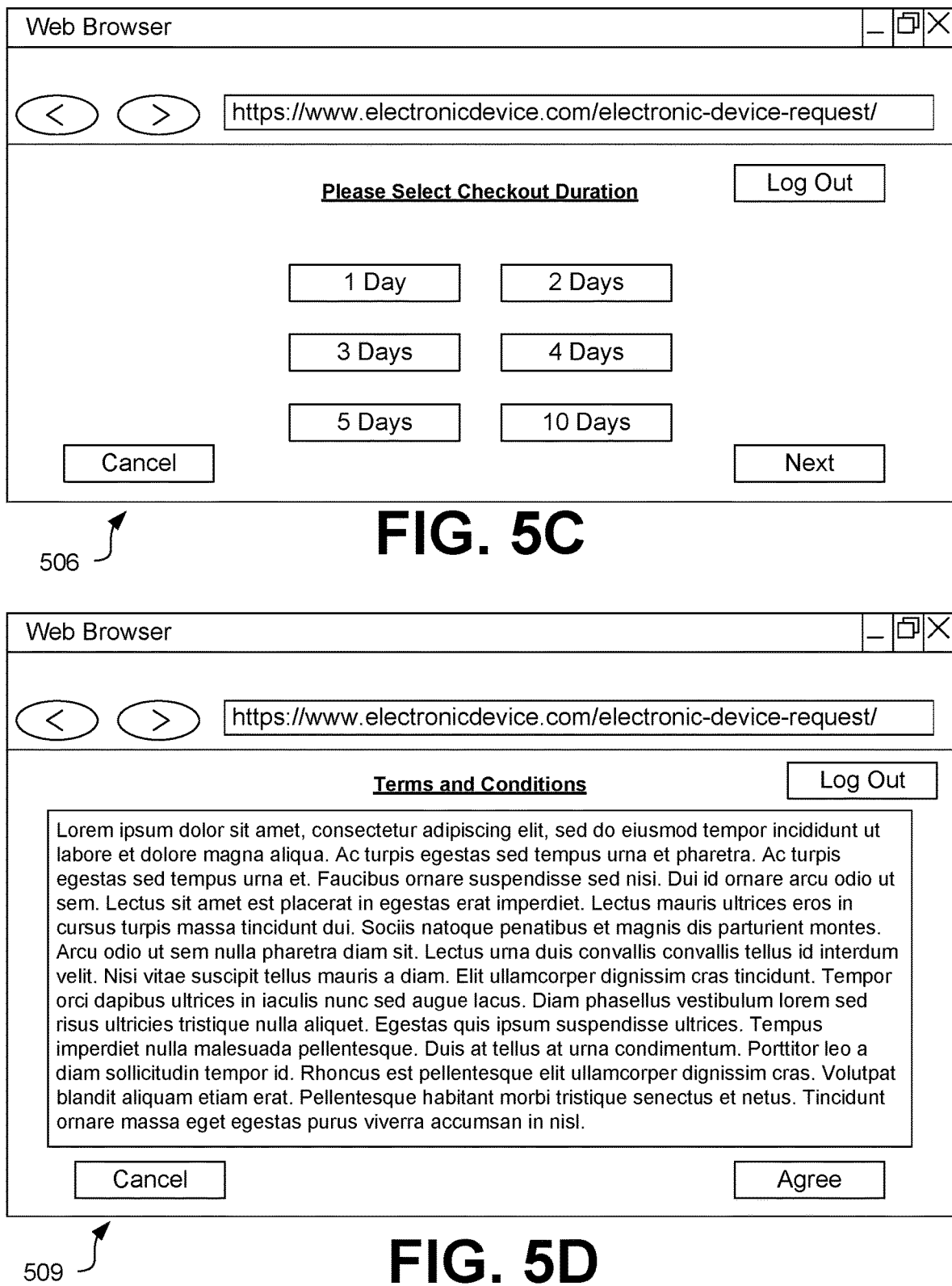
FIG. 5C is a user interface diagram according to various embodiments of the present disclosure.
FIG. 5D is a user interface diagram according to various embodiments of the present disclosure.

Continuing the example of FIGS. 5A and 5B, reference is now made to FIG. 5C, which illustrates another example user interface 506 that can be rendered on the web browser or client application 176. The user interface 506 shown in FIG. 4C displays a button representing the period of time for the duration of the electronic device rental. In some embodiments, the user can select the period of time from a list, a button selection, a table, or other similar method. In some embodiments, the user can input a duration for the rental. For example, if the user wanted to request the electronic device for 30 days, the user could specify the checkout duration. The user can cancel the request by clicking the "Cancel" button. In some examples, pressing the "Cancel" button can redirect the user to the main menu. In other examples, pressing the "Cancel" button can redirect the user to the previous page. In some examples, there could be a "Back" button to redirect the user to the previous page to make modifications. The user can select the time period and press the "Next" button to proceed to the next step of requesting the electronic device. The user can terminate the session by clicking the "Log Out" button. In some instances, clicking the "Log Out" button will redirect the user to the user interface of FIG. 5A.

Continuing the example of FIG. 5A-5C, reference is now made to FIG. 5D, which illustrates another example user interface 509 that can be rendered on the web browser or client application 176. The user interface 509 shown in FIG. 5D displays the "Terms and Conditions" for checking out the electronic device. The "Terms and Conditions" can be preset by the enterprise. In some instances, the "Terms and Conditions" could be modified by the administrator. The user can cancel the request by clicking the "Cancel" button. For example, the user can disagree with the terms by clicking the "Cancel" button which would cancel the request. In some examples, pressing the "Cancel" button can redirect the user to the main menu. In other examples, pressing the "Cancel" button can redirect the user to the previous page. In some examples, there could be a "Back" button to redirect the user to the previous page which could allow the user to make modifications. The user can read the "Terms and Conditions" and press the "Agree" button to proceed to the next step of requesting the electronic device. The user can terminate the session by clicking the "Log Out" button. In some instances, clicking the "Log Out" button will redirect the user to the user interface of FIG. 5A.

Figure 5E:
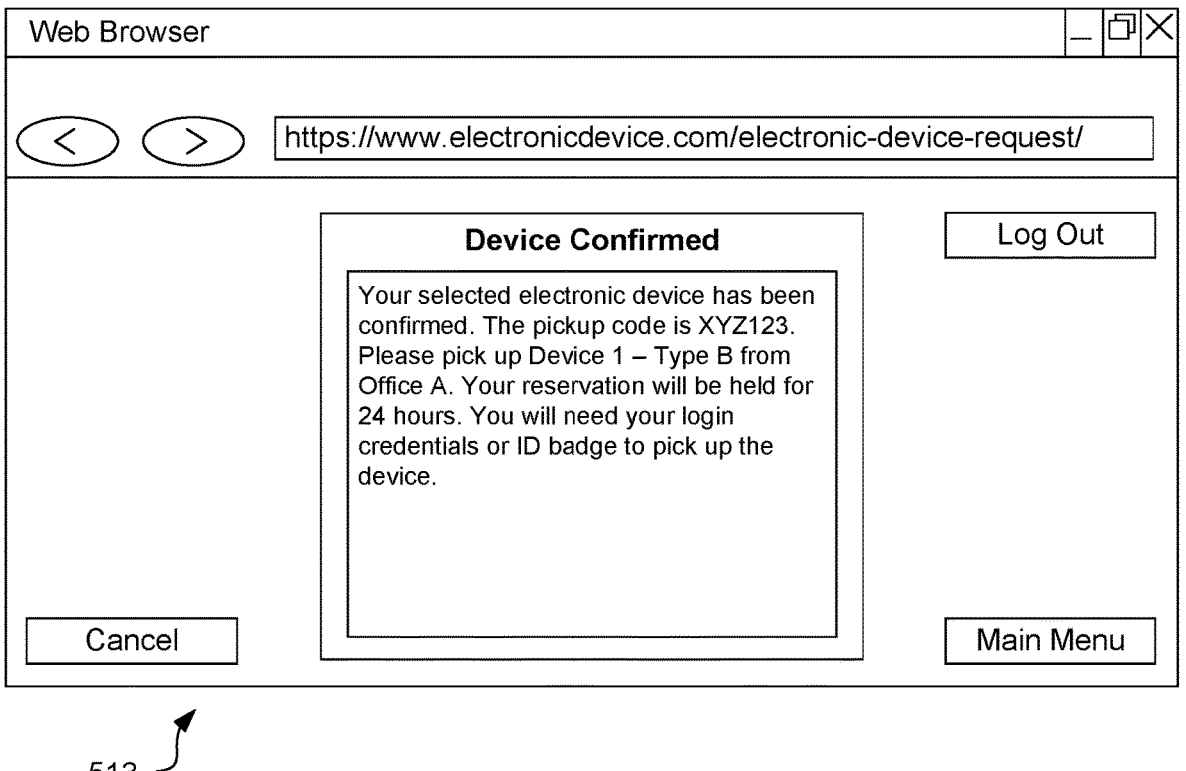
FIG. 5E is a user interface diagram according to various embodiments of the present disclosure.

Continuing the example of FIG. 5A-5D, reference is now made to FIG. 5E, which illustrates another example user interface 513 that can be rendered on the web browser or client application 176. The user interface 513 shown in FIG. 5E displays a message. In some instances, the user interface 513 can display a notification. For example, the message, alert, and/or notification can inform the user the electronic device request is completed, and the device can be picked up at the user selected location with the provided pickup code. In some instances, the message, alert, and/or notification can further inform the user of the checkout duration and a return date. In some embodiments, the message, alert, and/or notification can inform the user of the type of electronic device and the quantity of electronic devices checked out. The user can cancel the request by clicking the "Cancel" button. In some examples, pressing the "Cancel" button can redirect the user to the main menu. In other examples, pressing the "Cancel" button can redirect the user to the previous page. In some examples, there could be a "Back" button to redirect the user to the previous page which could allow the user to make modifications. The user can terminate the session by clicking the "Log Out" button. In some instances, clicking the "Log Out" button will redirect the user to the user interface of FIG. 4A. The user can navigate to the user interface 503 displaying the main menu of the electronic device checkout kiosk by the "Main Menu" button. In some instances, clicking the "Main Menu" button will redirect the user to the user interface of FIG. 4B.

Figures 6A, 6B:
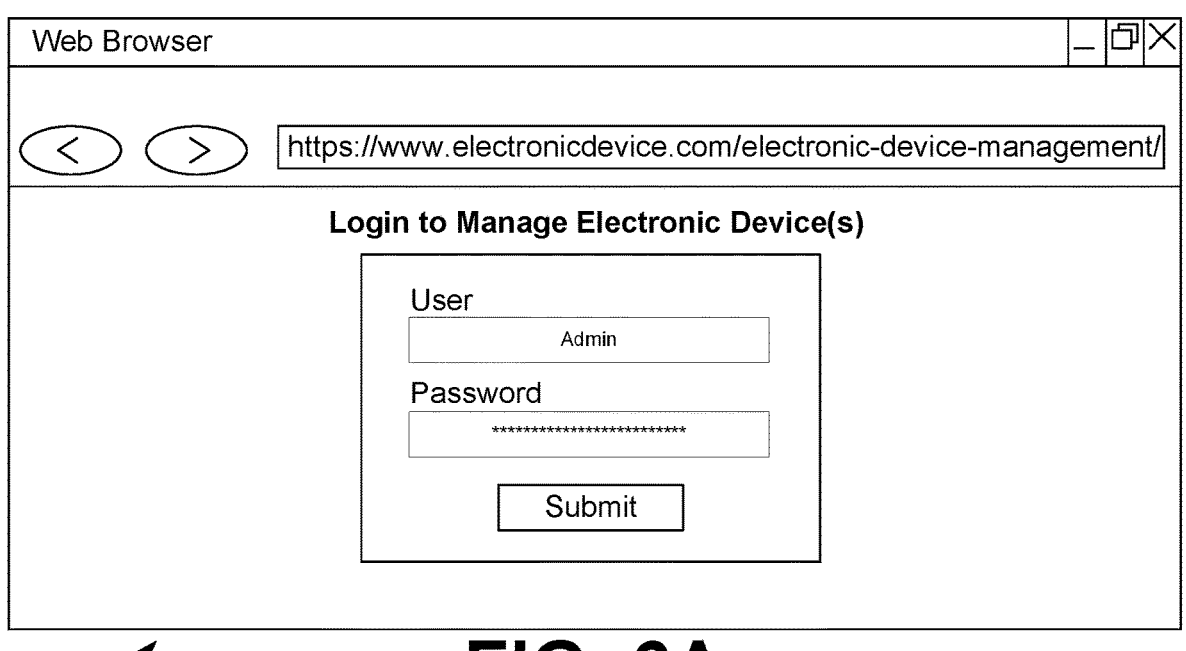
FIG. 6A is a user interface diagram according to various embodiments of the present disclosure.
FIG. 6B is a user interface diagram according to various embodiments of the present disclosure.

FIGS. 6A and 6B depict various examples of scenarios where an administrator could manage the one or more electronic devices that are checked out according to various embodiments of the present disclosure. In both of these examples, the administrator user is able to login in on the administrator application 156 or a web browser to manage the one or more electronic devices that are checked out. For example, the administrator could "extend" a time period of the check-out duration and/or send a refresh payload to the electronic device.

Referring to FIGS. 6A and 6B, shown is a user interface diagram 600 and 603, displayed on a display 159a (FIG. 1) of the administrator computing device 106 (FIG. 1). In some instances, the user interface 163a can be rendered on the display 159a by a web browser. In other instances, the user interface 163a can be rendered and displayed on a dedicated application, a mobile application, or other related environments. The user interface 163a represents an application to request one or more electronic devices. The user interface 163a can be rendered by the administrator application 156 (FIG. 1).

With reference to FIG. 6A, the user interface diagram 600 provides affordances for the administrator to input credentials, (e.g., username and password, physical security key, etc.) to manage the one or more electronic devices. The user interface of the web browser can be used to input the requested credentials. Once the credentials are entered, the administrator can click the "Submit" button to submit the credentials for authentication. In some examples, the credentials can be based at least in part on the user profile 129. In some embodiments, the user can be authenticated based at least in part on the user authorization data set 146.

Continuing the example of FIG. 6A, reference is now made to FIG. 6B, which illustrates another example user interface 603 that can be rendered on the administrator computing device 106. The user interface 603 shown in FIG. 6B displays the one or more electronic devices that are checked out. In some embodiments, the user interface can display an exemplary picture of the type of electronic device. In other examples, the user interface allows the administrator to select the type of electronic device to receive the device data 139. In some embodiments, the web browser or the administrator application 156 could display the electronic devices that are checked out in a table, list, and/or a similar view. For example, the user interface in FIG. 6B displays a list of checked out electronic devices, ID of the electronic device, name of the user that checked out the electronic device, the device type, and the date it was checked out. In some instances, the user interface in FIG. 6B could display the due date and/or the check-out duration. The user interface in FIG. 6B also allows the administrator to extend the check-out duration or send a refresh payload to the electronic device. The administrator can extend the check-out period by clicking the "Extend" button which could display a list of time duration to extend the rental of the electronic device. In some instances, the administrator can specify the duration of time period. The administrator can send the refresh payload to the electronic device by clicking the "Refresh" button. In some instances, the administrator can send the electronic device a package file 149. In some embodiments, the administrator can manage reservations made on the online reservation system, manage other administrators, and/or manage the electronic device check-out kiosks. The administrator can terminate the session by clicking the "Log Out" button. In some instances, clicking the "Log Out" button will redirect the user to the user interface of FIG. 6A.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show an example of the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM), dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein may execute in the same computing device, administrator computing device 106, client device(s) 109, or in multiple computing devices in the same computing environment 103. Additionally, it is understood that terms such as "application," "service," "system," "engine," "module," and so on can be interchangeable and are not intended to be limiting.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A method, comprising:
receiving a request for an electronic device;
in response to receiving the request, capturing, with a sensor, a device-identifier associated with the electronic device;
sending the device-identifier to a directory service;
enrolling, based at least in part on the device-identifier, the electronic device into a device management system;
receiving a package file from the directory service, the package file being associated with the device-identifier;
deploying the package file to the electronic device;
dispensing the electronic device; and
updating a state of the electronic device in at least a kiosk or the directory service.

2. The method of claim 1, wherein contents of the package file are customized based at least in part on a user role.

3. The method of claim 1, further comprising allocating the electronic device in response to receiving the request for the electronic device.

4. The method of claim 1, wherein the package file is a provisioning package file, the provisioning package file configured to install at least one of an application, a certificate, or a profile.

5. The method of claim 1, wherein the directory service sends a token to the device management system in response to receiving the device-identifier, wherein the token authenticate or authorize the device management system.

6. The method of claim 1, wherein the electronic device is configured to be secured by a set of user credentials, wherein the set of user credentials is obtained from the directory service.

7. A method, comprising:
receiving a request for returning an electronic device, the electronic device being in a checked out state;
receiving an indication the electronic device is being transitioned to a checked-in state;
alerting a device management system of the checked-in state of the electronic device;
capturing, with a sensor, a device-identifier identifying the electronic device;
sending the device-identifier to a directory service;
receiving a refresh payload from the directory service, the refresh payload being associated with the device-identifier, the refresh payload comprising one or more of a software application and an operating system;
deploying the refresh payload to the electronic device; and
updating a state of the electronic device in at least a kiosk or the directory service.

8. The method of claim 7, further comprising unenrolling, based at least in part on the device-identifier, the electronic device from the device management system.

9. The method of claim 7, wherein the request for returning the electronic device further comprises a request to return a plurality of electronic devices, wherein individual electronic devices of the plurality of electronic devices are in the checked out state.

10. The method of claim 7, wherein the refresh payload is a provisioning refresh payload configured to install at least one of an application, a certificate, or a profile.

11. The method of claim 7, wherein deploying the refresh payload to the electronic device further comprises:
erasing an existing operating system;
installing a new operating system;
installing a plurality of drivers; and
validating installation of the new operating system.

12. The method of claim 7, wherein the directory service sends a token to the device management system in response to receiving the device-identifier, wherein the token is used to authenticate or authorize the device management system.

13. The method of claim 12, wherein the token from the directory service authorizes the device management system to deploy the refresh payload to install a new operating system.

14. The method of claim 7, further comprising receiving a copy request to copy data from a first electronic device to a second electronic device, wherein the first electronic device and the second electronic device are in the checked-in state.

15. The method of claim 7, further comprising updating the device management system of a status of the electronic device.

16. A system, comprising:
at least one computing device; and
at least one application executable by the at least one computing device, wherein, when executed, the at least one application causes the at least one computing device to at least:
receive a request for one or more electronic devices;
in response to receiving the request, capture, with a sensor, a device-identifier associated with individual ones of the one or more electronic devices;
send the one or more device-identifiers to a directory service;
enroll, based at least in part on the device-identifier, the one or more electronic devices into a device management system;
receive a package file from the directory service, the package file being associated with the device-identifier of the individual ones of the one or more electronic devices;
deploy the package file to the individual ones of the one or more electronic devices;
dispense the one or more electronic devices; and
update a state of the one or more electronic devices in at least a kiosk or the directory service.

17. The system of claim 16, further comprising allocating the one or more electronic devices in response to receiving the request for the one or more electronic devices.

18. The system of claim 16, wherein the package file is a provisioning package file, the provisioning package file configured to install at least one of an application, a certificate, or a profile.

19. The system of claim 16, wherein the directory service sends a token to the device management system in response to receiving the device-identifier, wherein the token authenticate or authorize the device management system.

20. The system of claim 16, wherein the individual ones of the one or more electronic devices are configured to be secured by a set of user credentials, wherein the set of user credentials is obtained from the directory service.

* * * * *